Patented Mar. 10, 1936

2,033,720

UNITED STATES PATENT OFFICE 2,033,720

PURIFICATION OF ACETIC ANHYDRIDE

Newton Lamb, Saginaw, Mich., assignor to The Dow Chemical Company, Midland, Mich., a corporation of Michigan No Drawing. Application February 8, 1934, Serial No. 710,324

11 Claims. (Cl. 260—123)

This invention concerns an improved method of purifying acetic anhydride, particularly for removing sulphur and/or halogen compounds.

Commercial acetic anhydride is usually contaminated with small proportions of sulphur and halogen compounds, introduced during its manufacture, which cannot be removed by fractional distillation or other usual procedure. In U. S. Patent No. 1,467,074 it is disclosed that the sulphur impurities can be removed by treating the impure anhydride with manganese oxide and then distilling. Such treatment does not, however, result in an effective removal of the halogen impurities from the anhydride.

I have now found that the sulphur and halogen impurities may both be converted into insoluble materials by treating the impure acetic anhydride with cuprous oxide, and that substantially pure acetic anhydride can be separated from the resultant mixture by usual procedure, e. g. filtration, distillation, etc. The invention, accordingly, consists in the method of purifying acetic anhydride hereinafter fully described and particularly pointed out in the claims.

The essential step in my method consists in treating the impure acetic anhydride with cuprous oxide to precipitate the sulphur and halogen impurities contained therein. The cuprous oxide may be added as such or may be formed within the body of anhydride by adding thereto cupric oxide and copper, cupric hydroxide and copper, or other agents which will react to form cuprous oxide. The cuprous oxide is preferably employed in amount calculated as sufficient to convert the sulphur and halogen into cuprous sulphide and cuprous halide respectively. Metallic copper may advantageously be added to the mixture to assure maintenance of the copper compounds in cuprous condition, but its use is not essential. It may be mentioned, however, that the presence of cupric compounds, particularly cupric oxide, at the close of the heating operation interferes with the removal of the halogen impurities.

The reaction of the cuprous oxide with the impurities to form insoluble materials occurs slowly at room temperature, but may be effected more rapidly and completely by heating the mixture, preferably under reflux. The reaction is usually complete after about 10–30 minutes of boiling under reflux. The reacted mixture may be filtered to separate the insoluble impurities from the purified anhydride, but in practice I find it most convenient to separate the anhydride by distillation, in which case the impurities remain in the still as a residue of copper compounds. Copper can readily be recovered from the impurities by known procedure, e. g. oxidation to cupric oxide followed by reduction, etc.

A single treatment by the above method usually results in the removal of more than 95 per cent of the halogen and more than 98 per cent of the sulphur from the impure anhydride. The purification can be completed by re-treating the anhydride in the same manner.

The following examples illustrate certain ways in which the principle of my invention has been applied, but said examples are not to be construed as limiting the invention.

Example 1

A sample of commercial acetic anhydride (containing about 15 per cent by weight of acetic acid) was analyzed and found to contain 1.57 per cent by weight of chlorine and 0.448 per cent of sulphur, said elements being present of course as compounds thereof. 100 grams of the impure anhydride was treated with 5 grams of finely divided cuprous oxide and 0.75 gram of copper powder. The resultant mixture was heated under reflux for 15 minutes and then filtered. The filtrate was analyzed and found to contain only 0.0512 per cent by weight of chlorine and 0.003 per cent of sulphur. Approximately 97 per cent of the chlorine impurities and 99 per cent of the sulphur impurities were, accordingly, removed from the anhydride by this single treatment.

Example 2

A sample of acetic anhydride (containing approximately 15 per cent by weight of acetic acid), which had been treated with cuprous oxide by procedure similar to that described in Example 1 was analyzed and found to contain approximately 0.0075 per cent of chlorine and 0.043 per cent of sulphur, said elements being present as compounds thereof. 800 grams of the anhydride was treated with 3 grams of cuprous oxide and 0.5 gram of copper powder. The resultant mixture was heated under reflux for 15 minutes and distilled practically to dryness. The distillate was analyzed and found to contain less than 0.0001 per cent by weight of chlorine and less than 0.001 per cent of sulphur.

The invention is equally applicable to the removal of other halogen impurities, e. g. bromine compounds, from acetic anhydride which is contaminated therewith.

Although my invention is usually employed to remove both halogen and sulphur compounds from impure acetic anhydride, it may be employed to purify acetic anhydride which is contaminated with either of such impurities.

Other modes of applying the principle of my invention may be employed instead of those explained, change being made as regards the method herein disclosed, provided the step or steps stated by any of the following claims or the equivalent of such stated step or steps be employed.

I therefore particularly point out and distinctly claim as my invention:—

1. In a method of purifying acetic anhydride which is contaminated with sulphur and halogen compounds, the step which consists in treating the impure acetic anhydride with cuprous oxide.

2. In a method of purifying acetic anhydride which is contaminated with sulphur and halogen compounds, the step which consists in treating the impure acetic anhydride with cuprous oxide to precipitate the sulphur and halogen as copper compounds thereof.

3. In a method of purifying acetic anhydride which is contaminated with sulphur and halogen compounds, the step which consists in heating the impure acetic anhydride with cuprous oxide to precipitate the sulphur and halogen as copper compounds thereof.

4. In a method of purifying acetic anhydride which is contaminated with sulphur and halogen compounds, the steps which consist in treating the impure acetic anhydride with cuprous oxide and distilling relatively pure acetic anhydride from the resultant mixture.

5. In a method of purifying acetic anhydride which is contaminated with sulphur and chlorine compounds, the step which consists in treating the impure anhydride with cuprous oxide.

6. In a method of purifying acetic anhydride which is contaminated with sulphur and chlorine compounds, the step which consists in heating the impure anhydride with cuprous oxide to precipitate the sulphur and chlorine as copper compounds thereof.

7. In a method of purifying acetic anhydride which is contaminated with sulphur and chlorine compounds, the steps which consist in treating the impure anhydride with cuprous oxide in amount theoretically sufficient to convert the sulphur and chlorine into cuprous sulphide and cuprous chloride, and distilling relatively pure acetic anhydride from the resultant mixture.

8. In a method of removing halogen impurities from acetic anhydride which is contaminated therewith, the step which consists in treating the impure acetic anhydride with cuprous oxide.

9. In a method of removing halogen impurities from acetic anhydride which is contaminated therewith, the step which consists in heating the impure acetic anhydride with cuprous oxide to precipitate the halogen as a copper compound thereof.

10. In a method of removing halogen impurities from acetic anhydride which is contaminated therewith, the steps which consist in heating the impure acetic anhydride with cuprous oxide and distilling relatively pure acetic anhydride from the resultant mixture.

11. In a method of removing chlorine impurities from acetic anhydride which is contaminated therewith, the steps which consist in heating the impure acetic anhydride with cuprous oxide and distilling relatively pure acetic anhydride from the resultant mixture.

NEWTON LAMB.